Dec. 2, 1952 | A. SNIJDERS | 2,620,395

CODE CONVERTER

Filed June 26, 1948 | 3 Sheets-Sheet 1

Inventor

Antonie Snijders

[illegible]

Dec. 2, 1952 A. SNIJDERS 2,620,395

CODE CONVERTER

Filed June 26, 1948 3 Sheets-Sheet 2

Inventor:
Antonie Snijders

Dec. 2, 1952 A. SNIJDERS 2,620,395

CODE CONVERTER

Filed June 26, 1948 3 Sheets-Sheet 3

Inventor
Antonie Snijders

Patented Dec. 2, 1952

2,620,395

UNITED STATES PATENT OFFICE 2,620,395

CODE CONVERTER

Antonie Snijders, The Hague, Netherlands

Application June 26, 1948, Serial No. 35,403
In the Netherlands June 30, 1947

15 Claims. (Cl. 178—26)

This invention relates to a device for converting signals given in a first arbitrary code into signals expressed in another arbitrary code.

The code-converter according to the invention comprises a device for converting by electronic means signals from one or more codes of arbitrary nature into one or more other codes, the converter having for every signal element in the first codes two indication points (contact), a certain standard voltage being applied to one of these (identified as the "spacing" point) or to the other (called the "marking" point) if the corresponding element of the applied signal is a space or mark, respectively; the standard voltage may be ground potential. The nature of the device is such that if one of the indication points receives standard voltage, the other receives a voltage deviating from the standard in a single given direction, this direction of deviation being the same throughout the entire device.

If the converter is designed for the conversion of $p$ signals an equal number of output conductors is provided, each of these being connected by $n$ conductors comprising resistances to a variation of indication points corresponding to the variation of the elements of the input signal for which, when it is applied to the code-converter, the output conductor acquires the standard voltage, $n$ being the total number of elements comprised in the signals in the first codes, which are to be converted. This first part of the code-converter constitutes the analyzer, indicating by standard voltage on one of $p$ output conductors whichever of $p$ input signals is being applied to the code-converter input. When reduced to practice the $n$ conductors connected to each of the $p$ conductors may form one junction. The remaining $p-1$ conductors receive voltages deviating from the standard voltage in the standard direction, as will be explained hereafter. The analyzer thus converts from a code of $n$ elements into a code of $p$ elements having a contact space-mark ratio $p-1:1$.

The device also comprises a synthetizing part ensuring the formation of a signal in the new code or codes with $m$ elements In general, the conversion from a code having $n$ elements, each of which elements has two indications (space and mark) thus comprising $2^n$ variations, into $p$ variations of a code having $m$ elements, necessitates an analyzer in which the signals are first analyzed or converted into a code having $p$ elements and then this code is synthesized or converted into the code having $m$ elements. When the total number of variations of the code having $m$ elements exceeds $2^n$ variations as allowed by the code having $n$ elements, the synthetizing part for further converting the analyzed $2^n$ variations, also may be provided with means for adding signals to the $2^n$ variations of the code having $n$ elements to make up the difference between the $2^n$ and $p$ variations allowed by the code of $m$ elements. If it is assumed that the code having $n$ elements permits $2^n=p'$ variations, while $p$ variations are possible in the code having $m$ elements, the arrangement may be so provided that $p'$ is a power of 2 which approximates the number $p$. Thus one may express $n$ in terms of $p'$ by solving the equation $2^n=p$ for $n$;

$$n=\log_2 p'$$

and substituting a common logarithm base in this equation instead of base 2, from the formula:

$$\log_2 p'=\frac{\log p'}{\log 2}$$

then $$n=\frac{\log p'}{\log 2}$$

The device according to this invention converts from one arbitrary code into another practically without inertia, the only limiting factor to speed being determined by the speed with which the texts may be supplied to the device and taken from it. The action of the code-converter is static and it occupies little space.

The converter may be adapted to definite codes beforehand by making the requisite connections on a cross-connecting board.

This invention will be described with reference to two figures showing by way of example the conversion of a five-unit code into a seven unit code. It will be clear that neither the number of elements of the codes is limited to five and seven nor is the number of codes limited to one.

Figure 1:
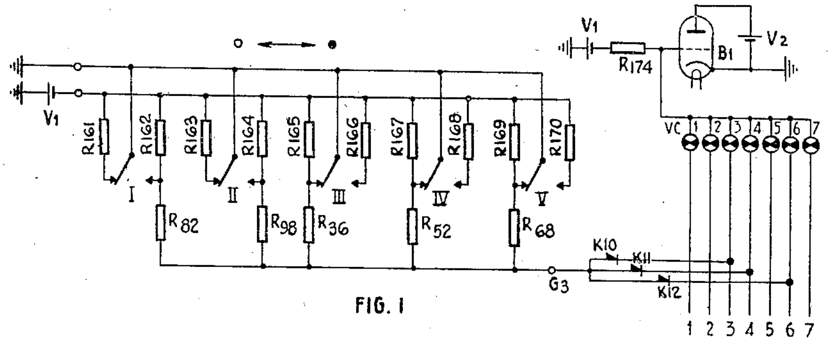
Figure 1 is a circuit diagram showing the principle of the converter.

The principle of the code-converter according to Fig. 1 is explained in connection with the conversion of a definite signal from a five-unit code into another code, in this case with 7-units, this code satisfying the special condition of having four spacing elements in every signal, as may be required in a radio typing system.

The code may be supplied to the converter as punchings in a tape.

Contacts I–V in Fig. 1 represent change-over contacts in an automatic keyer served by this tape. Alternatively these contacts may belong to relays not shown in the figure.

The tongues of these contacts are connected to one another and to one of the poles of a voltage source $V_1$, (ground).

The spacing and marking contacts which cooperate with the tongues I–V are all connected through equal resistances $R_{161-170}$ to the other pole of the source $V_1$.

A conductor G3 is shown, by way of example for one signal, to be connected by resistances $R_{82}$—$R_{98}$ to a variation of the markings and spacing contacts of each of the tongues I–V. In Fig. 1 resistances $R_{82}$ and $R_{98}$ are connected to the marking contacts cooperating with tongues I and II, and resistances $R_{36}$, $R_{52}$ and $R_{68}$ are connected to the spacing contacts cooperating with tongues III–V. The resistances $R_{82}$, $R_{36}$, $R_{52}$ and $R_{68}$ may be assumed to be resistors in the description which follows. In the example of a five-unit code tongues I–V constitute 32 different variations. For only one of these, conductor G3 will carry ground potential, in Fig. 1 for the variation having tongues I and II on the marking contact and tongues III, IV and V on the spacing contact. Through the tongues I–V ground is applied in this case to resistances $R_{82}$, $R_{98}$, $R_{36}$, $R_{52}$ and $R_{68}$.

If a variation opposite to the one just considered is on the tongues the potential of conductor G3 will be as different from ground as possible. For all other variations of the positions of the tongues conductor G3 will assume other potentials corresponding to four values intermediate between ground and the potential just considered.

Conductor G3 is connected to an output yielding the desired output code. In Fig. 1 it is a seven unit code. Conductors 1–7 end in an equal number of distributors VC1–7, which successively connect a discriminator circuit, represented by a tube B1, to each of conductors 1–7 for examining their potential. Conductor G3 is connected with a predetermined combination of conductors 1–7 by way of rectifier cells e. g. K10–12 in order to prevent undesired couplings between the conductors 1–7 and thereby to connect only those conductors which are to receive the standard potential. The seven distributor contacts VC1–7 successively connect the seven conductors to a high-ohmic resistance $R_{174}$ and to the grid of the discriminator tube B1 in the anode circuit of which is provided a source $V_2$. The other end of this resistance is connected to the negative pole of source $V_1$.

The values of the elements are such that only for the characteristic of Fig. 1 conductors VC3, 4 and 6 will practically be at ground potential, the potentials of conductors VC1, 2, 5 and 7 being indefinite. Thus on the successive closure of the seven distributor contacts, tube B1 will be in non-conductive condition when the contacts 1, 2, 5 and 7 are closed and conductive at the closing of contacts 3, 4 and 6, for when 1, 2, 5 and 7 are closed and 3, 4 and 6 are open, the negative potential from $V_1$ will bias B1 to cut-off and in the other moments the potentials of conductors 3, 4 and 6 which are practically ground due to the relatively small value of resistances $R_{82}$, $R_{98}$, $R_{36}$, $R_{52}$, $R_{68}$, and the high value of resistance $R_{174}$ will result in the conducting condition of tube B1. Fig. 1 does not show the manner in which the output code is utilized, this being no part of the invention.

Figure 2:
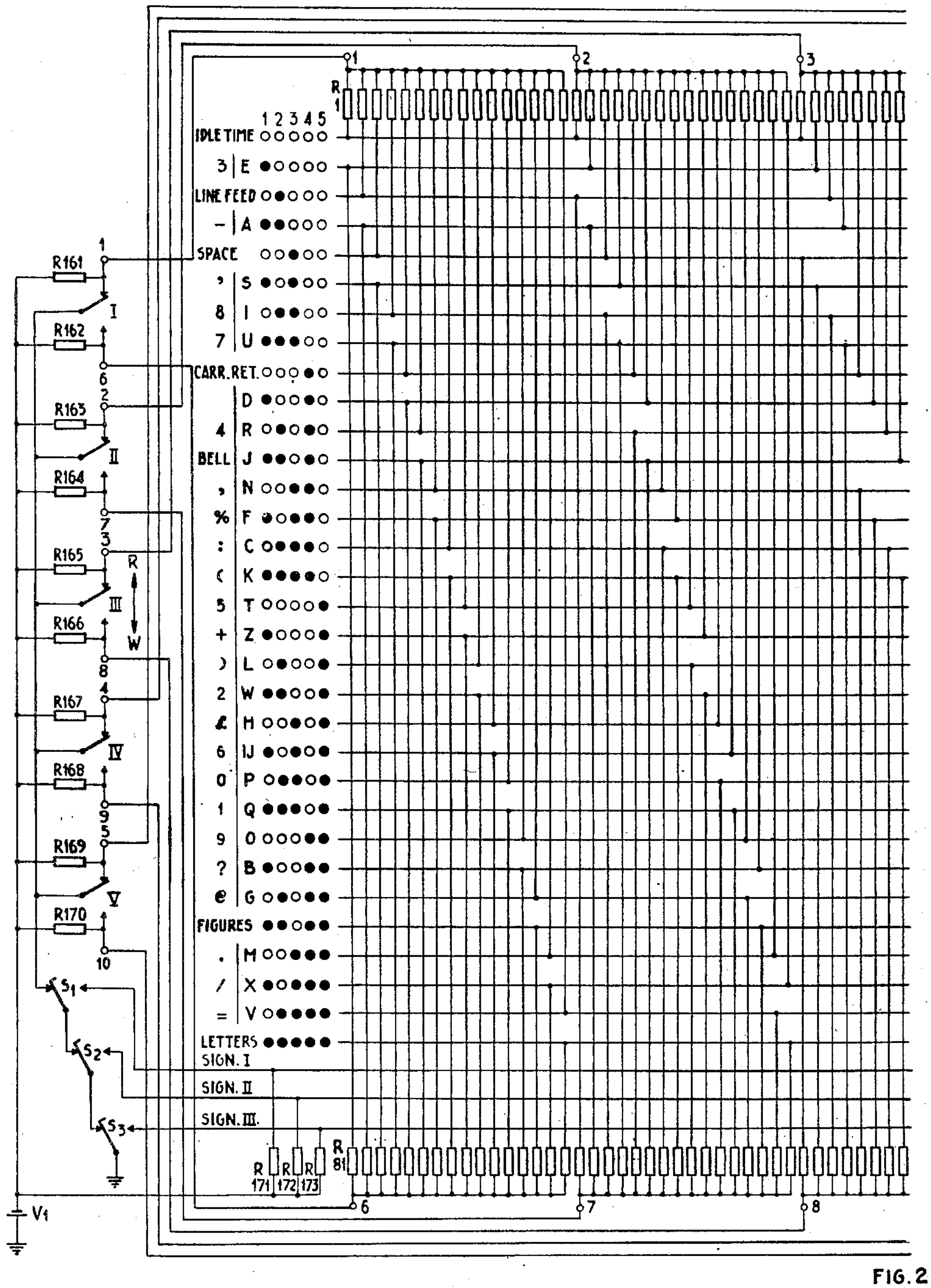
Figures 2 and 2A show a complete circuit for the conversion for five unit into seven unit code.
Figure 2A:
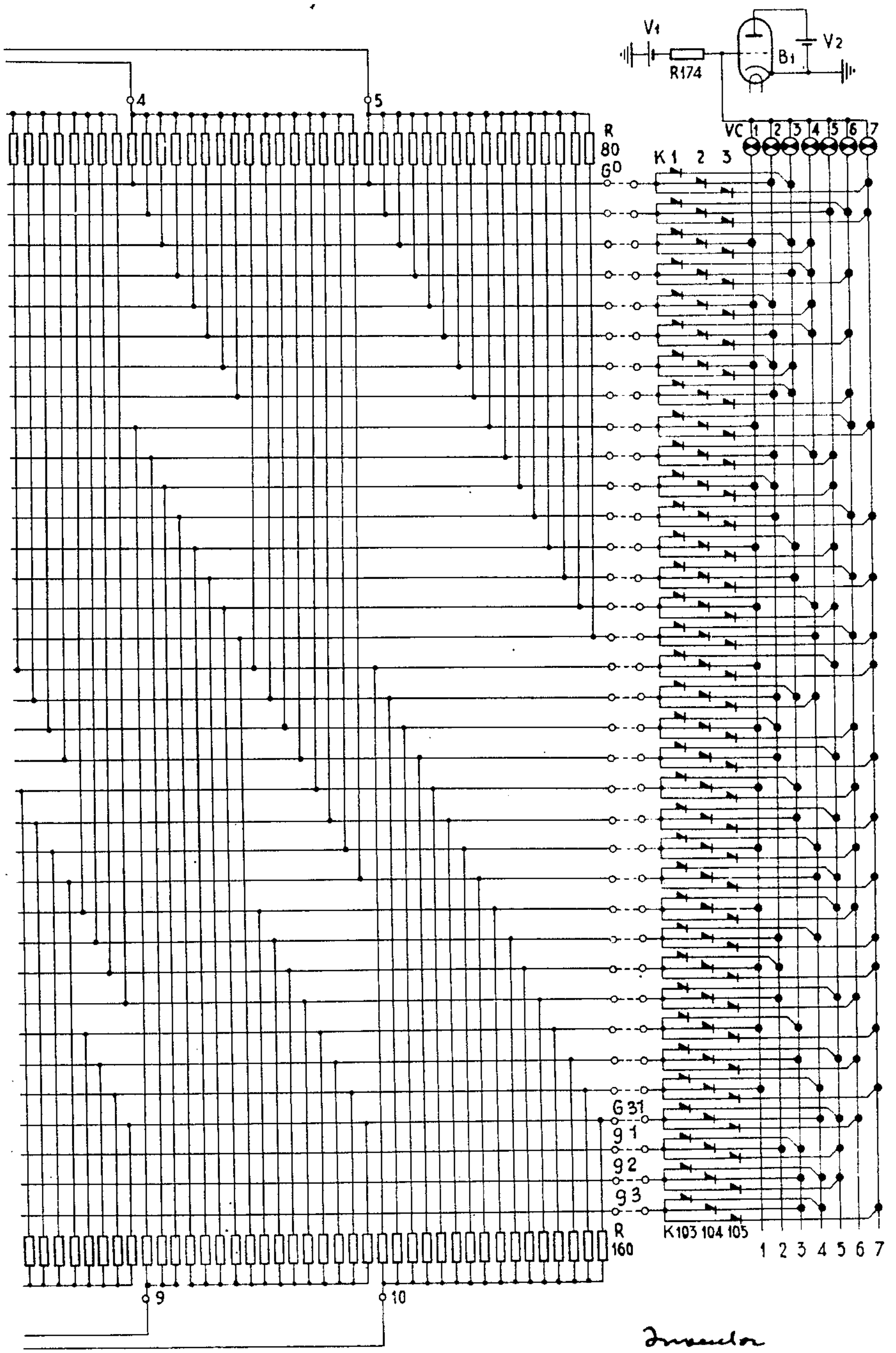

The converter according to the invention is shown more completely in Figs. 2 and 2A relating to a conversion of a five-unit code comprising $2^5=32$ variations into a seven-unit code having a constant space-mark ratio 3:4 with the possibility of $$\frac{7!}{3!4!}=35 \text{ variations}$$

32 of which are formed from the five-unit code, the three remaining variations being generated on the operation of one of the contacts S1, S2, or S3.

A conductor G as discussed already with reference to Fig. 1 is provided for each of the 32 variations; it is connected by five conductors each comprising one of the resistances $R_{1-160}$ forming a resistance matrix connected to the conductors G to five of the indication points, 1–10. Points 1–5 are identified as spacing indication points and points 6–10 as marking indication points. The connection is effected in accordance with the variation corresponding to the intermediate output conductor considered.

For signal OOOOO consisting of five spacing elements, tongues I–V will occupy positions as indicated and thus apply ground to spacing indication points 1–5, so that the uppermost horizontal intermediate output conductor $G_0$ receives a standard potential such as ground potential, namely over resistances $R_1$, $R_{17}$, $R_{33}$, $R_{49}$, $R_{65}$. The second horizontal intermediate output conductor for instance will receive a different potential even though it receives ground through resistances $R_{18}$, $R_{34}$, $R_{50}$ and $R_{66}$, because through resistances $R_{81}$ and $R_{152}$ it receives the voltage of the other battery pole. On examination it will be evident that for every applied signal there will always be only one single intermediate output conductor at ground potential, namely that connected to the indication points 1–10 in a variation corresponding to the variation of the applied signal.

In the embodiment shown in Figs. 2 and 2A of the drawing voltage is supplied to the indication points 1–10 by connecting each of these points through one of the resistances $R_{161}$–$R_{170}$ to battery pole (of "deviating voltage") and by connecting the tongue to the ground ("standard voltage").

If E is received, for instance, tongue I will be on the lower contact and ground on indication point (contact) 6 and also on points 2, 3, 4 and 5 (as tongues II, III, IV and V will be at normal and battery will be on the other points which will therefore deviate in voltage). Thus the second horizontal intermediate output conductor receives ground potential.

The potential distribution over the 32 conductors is as follows:

A single conductor (the desired one) is at ground potential, 5 conductors are at a potential more negative by one unit level, 10 conductors are at a potential more negative by two unit levels, 10 conductors are at a potential more negative by three unit levels, 5 conductors are at a potential more negative by four unit levels, 1 conductor corresponding to the variation opposite to the one considered is at a potential more negative by five unit levels.

Each of the 32 conductors is connected through rectifier cells to the variation of the 7 output conductors characteristic to this horizontal intermediate output conductor. This may be chosen at will and may easily be varied by means of a cross-connecting board.

Owing to the connection of each of the 32 horizontal intermediate output conductors to certain three conductors of the common set of 7 vertical code-converters an effect is produced which is not evident from Fig. 1 in which only a single output conductor with its connections is considered.

As explained, three of these conductors will receive ground from the horizontal intermediate output conductor which itself is at ground potential; the other output conductors will be, as stated, at various more negative levels and the other vertical output code conductors will be connected to the other horizontal intermediate output conductors by connections containing rectifying cells constituting a rectifier matrix, which act in such a manner as to allow a vertical output conductor to assume only the least negative potential of all of the horizontal intermediate output conductors to which it is connected. It is therefore highly probable, that the four vertical output conductors which at any time are not at ground potential will assume a negative potential not more negative than the first negative level considered above. This level should be sufficiently negative to cut off the discriminating tube on the closure of the corresponding distributor contact VC.

The seven-unit code conditioned to three marking elements in every variation comprises 35 different variations which are three more than the 32 variations of the five-unit code. These three additional variations may be controlled by separate contacts S1–S3, the closure of any one of which completely cuts off the input control circuit with the tongues I–V and applies ground potential to one of the additional horizontal intermediate output conductors g1–g3 which in its turn correctly marks three of the seven vertical output code conductors through rectifiers K97—K99, K100—K102 or K103—K105. As the resistance and the rectifiers are arranged in matrices the conductors and connections thereon may be termed junctions.

Complicated code translations such as those required in some automatic telephone systems which determine from 3 or more given digits a quite different digit variation can be obtained by a combination of devices according to the invention. Thus an unlimited translation of number systems may be obtained.

I claim:

1. A device for converting signals from a code of five elements into another code of seven elements, comprising in combination, five pairs of contacts; five members, each adapted to take two positions in which said member applies a standard potential to one of the contacts of said pairs, respectively; means for applying potentials differing from the standard potential in the same sense to the contacts of said pairs which are not at standard potential; thirty-two output conductors; five resistances for each of said output conductors connecting, respectively, said output conductors to a contact of each of said pairs; ninety-six input conductors; and means for connecting, respectively, to said output conductors an individual combination of three of said input conductors.

2. A device for converting signals from a code of five elements into another code of seven elements, comprising in combination, five pairs of contacts; five members, each adapted to take two positions in which said member applies a standard potential to one of the contacts of said pairs, respectively; means for applying potentials differing from the standard potential in the same sense to the contacts of said pairs which are not at standard potential; thirty-two output conductors; five resistances for each of said output conductors connecting, respectively, said output conductors to a contact of each of said pairs; ninety-six input conductors; and means including rectifier cells for connecting, respectively, to said output conductors an individual combination of three of said input conductors.

3. A device for converting signals from a code of five elements into another code of seven elements, comprising in combination, five pairs of contacts; five members, each adapted to take two positions in which said member applies a standard potential to one of the contacts of said pairs, respectively; means for applying potentials differing from the standard potential in the same sense to the contacts of said pairs which are not at standard potential; thirty-two intermediate output conductors; five resistances for each of said intermediate output conductors connecting, respectively, said intermediate output conductors to a contact of each of said pairs; seven output conductors; means including rectifier cells for connecting, respectively, to said intermediate output conductors an individual combination of three of said seven output conductors; a discriminator; and means for connecting said discriminator successively to said seven output conductors.

4. A device for converting signals from a code of five elements into another code of seven elements, comprising in combination, five pairs of contacts; five members, each adapted to take two positions in which said member applies a standard potential to one of the contacts of said pairs, respectively; means for applying potentials differing from the standard potential in the same sense to the contacts of said pairs which are not at standard potential; thirty-two intermediate output conductors; five resistances for each of said intermediate output conductors connecting, respectively, said intermediate output conductors to a contact of each of said pairs; three additional intermediate output conductors; means for applying a standard potential to said additional intermediate output conductors, respectively; seven output conductors; means including rectifier cells for connecting, respectively, to said intermediate output conductors an individual combination of three of said seven output conductors; a discriminator; and means for connecting said discriminator successively to said seven output conductors.

5. A device for converting signals from a code of five elements into another code of seven elements, comprising in combination, five pairs of contacts; five members, each adapted to take two positions in which said member applies a standard potential to one of the contacts of said pairs, respectively; means for applying potentials differing from the standard potential in the same sense to the contacts of said pairs which are not at standard potential; thirty-two output conductors; five resistances for each of said output conductors connecting, respectively, said output conductors to a contact of each of said pairs; three additional output conductors; means for applying a standard potential to said additional output conductors, respectively; resistances connected, respectively, to said additional output conductors; and means for applying to said resistances connected to said additional output conductors a potential differing the same sense from the standard potential as those applied to the contacts of said pairs which are not at standard potential.

6. A device for converting $p$ signals from one code having $n$ elements into another code having $m$ elements, comprising in combination, $p$ conductors for the one code having $n$ elements; $m$ conductors for the other code having $m$ elements; a rectifier matrix connecting said $p$ conductors for the one code having $n$ elements to said $m$ conductors for the other code having $m$ elements; and means including a matrix for indicating one signal of the code to be converted.

7. A device for converting signals from one code having $p$ elements into another code having $m$ elements, the codes having a constant space-mark ratio, comprising in combination, $p$ conductors for the one code having $p$ elements; $m$ conductors for the other code having $m$ elements; and a matrix including a plurality of rectifiers for connecting said $p$ conductors for the one code having $p$ elements to said $m$ conductors for the other code having $m$ elements, said rectifiers forming groups having equal numbers of said rectifiers, each of said groups being connected to each of said $p$ conductors of the one code having $p$ elements, the numbers of rectifiers in said groups being in a predetermined relation to the constant number of marks and spaces, respectively.

8. A device for converting signals from one code having $p$ elements into another code having $m$ elements, the one code having $p$ elements having a space-mark ratio of $p-1:1$, comprising in combination, $p$ conductors for the one code having $p$ elements; $m$ conductors for the other code having $m$ elements; a rectifier matrix connecting said $p$ conductors for the one code having $p$ elements to said $m$ conductors for the other code having $m$ elements; and means including a matrix having junctions for imparting a standard potential to one of said $p$ conductors by arbitrary application of control voltages to said junctions.

9. A static selecting device for converting signals from one code having $p$ elements into another code having $m$ elements, comprising in combination, $p$ conductors for the one code having $p$ elements, said $p$ conductors being at different potentials with only one at a standard potential corresponding to the signal to be converted; $m$ conductors for the other code having $m$ elements; and a rectifier matrix connecting said $p$ conductors for the one code having $p$ elements to said $m$ conductors for the other code having $m$ elements, and for connecting said standard potential to at least a predetermined one of said $m$ conductors.

10. A static selecting device for converting $p$ signals from one code having $n$ elements into another code having $m$ elements, $p$ being an integer different from $n$, comprising in combination, $p$ conductors for the one code having $n$ elements, said $p$ conductors being at different potentials with one at a standard potential corresponding to the signal to be converted; $m$ conductors for the other code having $m$ elements; and a rectifier matrix connecting said $p$ conductors for the one code having $n$ elements to said $m$ conductors for the other code having $m$ elements and for connecting said standard potential to at least a predetermined one of said $m$ conductors, said $m$ conductors forming the junctions at one end of said rectifiers of said matrix.

11. A device for converting signals from one code having $p$ elements having a constant space-mark ratio of $p-1:1$ into another code having $m$ elements, comprising in combination, $p$ conductors for the one code having $p$ elements; $m$ conductors for the other code having $m$ elements; a rectifier matrix connecting said $p$ conductors for the one code having $p$ elements to said $m$ conductors for the other code having $m$ elements, said $m$ conductors for the other code having $m$ elements forming the junctions at one end of said rectifiers of said matrix; a voltage discriminating device; and distributor contacts connecting said junctions, respectively, to said voltage discriminating device.

12. A device for converting signals from one code having $p$ elements having a constant space-mark ratio of $p-1:1$ into another code having $m$ elements having a constant space-mark ratio, comprising in combination, $p$ conductors for the one code having $p$ elements; $m$ conductors for the other code having $m$ elements; a rectifier matrix connecting said $p$ conductors for the one code having $p$ elements to said $m$ conductors for the other code having $m$ elements; and a resistance matrix for imparting potential levels to said $p$ conductors for the one code having $p$ elements, one of said $p$ conductors for the one code having $p$ elements receiving a standard potential.

13. A device for converting $p$ signals from one code having $n$ elements first into an intermediate code having $p$ elements and a constant space-mark ratio of $p-1:1$ and then into another code having $m$ elements having a constant space-mark ratio, comprising in combination, $p$ conductors for the intermediate code having $p$ elements; $m$ conductors for the other code having $m$ elements; a rectifier matrix connecting said $p$ conductors for the intermediate code having $p$ elements to said $m$ conductors for the other code having $m$ elements; and a resistance matrix for imparting potential levels to said $p$ conductors for the intermediate code having $p$ elements, one of said $p$ conductors for the one code having $p$ elements receiving a standard potential, said resistance matrix having $n$ junctions to each of said $p$ conductors for the one code having $n$ elements for imparting two control voltages to said resistance matrix.

14. A device for converting $p'$ signals from one code having $n$ elements first into an intermediate code having $p$ elements and a constant space-mark ratio of $p-1:1$ and then into another code having $m$ elements having a constant space-mark ratio, $p$ being an integer greater than $p'$, comprising in combination, $p$ conductors for the intermediate code having $p$ elements; $m$ conductors for the other code having $m$ elements; a rectifier matrix connecting said $p$ conductors for the intermediate code having $p$ elements to said $m$ conductors for the other code having $m$ elements; a resistance matrix for imparting potential levels to at least $p'$ of said $p$ conductors for the intermediate code having $p$ elements, one of said $p$ conductors for the intermediate code having $p$ elements receiving a standard potential, said resistance matrix having $n$ junctions to each of said $p$ conductors of the intermediate code having $p$ elements for imparting two control voltages to said resistance matrix from one end of the resistances of said resistance matrix; and 2

$$\frac{\log p'}{\log 2}$$

conductors, the other end of the resistances of said resistance matrix being connected to said 2

$$\frac{\log p'}{\log 2}$$

conductors, $p'$ being a number approximately equal to $p$ which number is a power of 2.

15. A device for converting $p'$ signals from one code having $n$ elements first into an intermediate code having $p$ elements and a constant space-mark ratio of $p-1:1$ and then into another code having $m$ elements having a constant space-mark ratio, $p$ being an integer greater than $p'$, comprising in combination, $p$ conductors for the intermediate code having $p$ elements; $m$ conductors for the other code having $m$ elements; a rectifier matrix connecting said $p$ conductors for the intermediate code having $p$ elements to said $m$ conductors for the other code having $m$ elements; a resistance matrix for imparting potential levels to at least $p'$ of said $p$ conductors for the intermediate code having $p$ elements, one of said $p$ conductors for the intermediate code having $p$ elements receiving a standard potential, said resistance matrix having $n$ junctions to each of said $p'$ conductors for the intermediate code having $p$ elements for imparting two control voltages to said resistance from one end of the resistances of said resistance matrix; 2 $n$ conductors, the other end of the resistances of said resistance matrix being connected to said 2 $n$ conductors; resistances connecting said 2 $n$ conductors and the remaining $p$ minus $p'$ conductors of said intermediate code having $p$ elements to a common voltage source; and means for imparting a standard voltage to said 2 $n$ conductors.

ANTONIE SNIJDERS.

REFERENCES CITED

The following references are of record in the file of this patent:

UNITED STATES PATENTS

| Number | Name | Date |
|---|---|---|
| 2,139,079 | Haselton | Dec. 6, 1938 |
| 2,279,353 | Van Duuren | Apr. 14, 1942 |
| 2,336,910 | Zenner | Dec. 14, 1943 |
| 2,369,474 | Luhn | Feb. 13, 1945 |
| 2,428,811 | Rajchman | Oct. 14, 1947 |
| 2,473,444 | Rajchman | June 14, 1949 |
| 2,476,066 | Rochester | July 12, 1949 |

FOREIGN PATENTS

| Number | Country | Date |
|---|---|---|
| 499,900 | Great Britain | Jan. 31, 1939 |